(12) United States Patent
Kim

(10) Patent No.: US 8,643,224 B2
(45) Date of Patent: Feb. 4, 2014

(54) HIGH VOLTAGE SAFETY DEVICE FOR HIGH VOLTAGE BATTERY

(75) Inventor: Dal Kim, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 353 days.

(21) Appl. No.: 12/899,129

(22) Filed: Oct. 6, 2010

(65) Prior Publication Data

US 2011/0127855 A1    Jun. 2, 2011

(30) Foreign Application Priority Data

Nov. 30, 2009  (KR) ................. 10-2009-0116632

(51) Int. Cl.
*H02H 11/00* (2006.01)

(52) U.S. Cl.
USPC ........................................................ 307/326

(58) Field of Classification Search
USPC .................. 307/10.7, 116, 119, 134, 326; 439/135–140, 142, 144, 146, 148, 149, 439/188, 521, 522, 901, 754; 200/43.16, 200/43.22, 50.03, 50.18, 50.29, 293.1
See application file for complete search history.

(56) References Cited

U.S. PATENT DOCUMENTS

| | | | | | |
|---|---|---|---|---|---|
| 4,912,747 | A | * | 3/1990 | Sakama et al. | 361/600 |
| 5,700,079 | A | * | 12/1997 | Woerner et al. | 362/496 |
| 5,971,801 | A | * | 10/1999 | Kato et al. | 439/511 |
| 6,817,873 | B1 | * | 11/2004 | Gorman | 439/140 |
| 7,125,268 | B1 | * | 10/2006 | Marukawa et al. | 439/133 |
| 7,164,083 | B1 | * | 1/2007 | Carroll | 174/67 |
| 7,775,813 | B1 | * | 8/2010 | Filiba | 439/139 |
| 8,047,859 | B2 | * | 11/2011 | Chang | 439/135 |
| 2009/0197456 | A1 | * | 8/2009 | Kawai et al. | 439/465 |
| 2010/0136809 | A1 | * | 6/2010 | Andres et al. | 439/133 |

FOREIGN PATENT DOCUMENTS

| | | |
|---|---|---|
| JP | 2002175791 A | 6/2002 |
| JP | 2006136097 A | 5/2006 |
| JP | 2009-054329 A | 3/2009 |

OTHER PUBLICATIONS

GB821270A[1] Fulmen.*

* cited by examiner

*Primary Examiner* — Rexford Barnie
*Assistant Examiner* — Rasem Mourad
(74) *Attorney, Agent, or Firm* — Edwards Wildman Palmer LLP; Peter F. Corless

(57) ABSTRACT

A high voltage safety device for a high voltage battery is provided, which comprises: a switch terminal forming a switch of an electric circuit for a high voltage portion and protruding to be fitted in a position hole of a high voltage cover; and a plug forming the electric circuit by connecting the switch when being fitted on the switch terminal and having a size occupying a portion of the high voltage cover. With the safety device, it is possible to prevent unintended separation of a high voltage cover without using a relatively expensive interlock, thereby ensuring safety.

4 Claims, 3 Drawing Sheets

FIG. 3
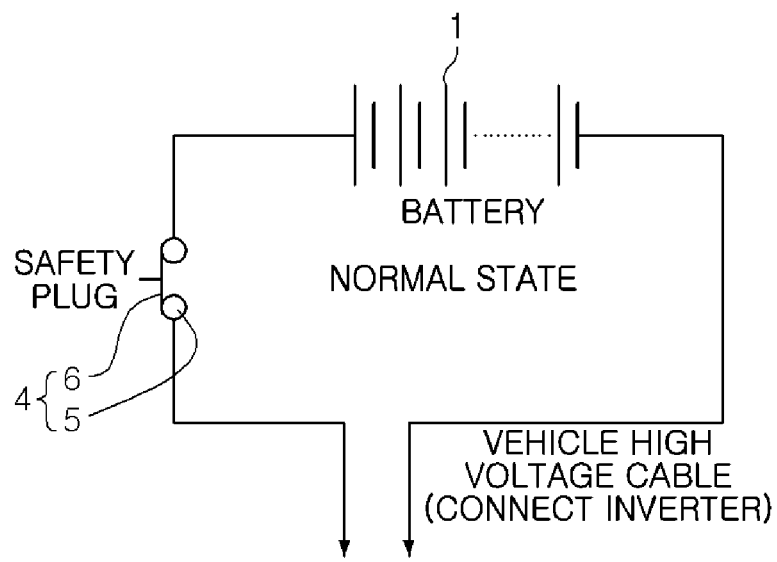
(A)
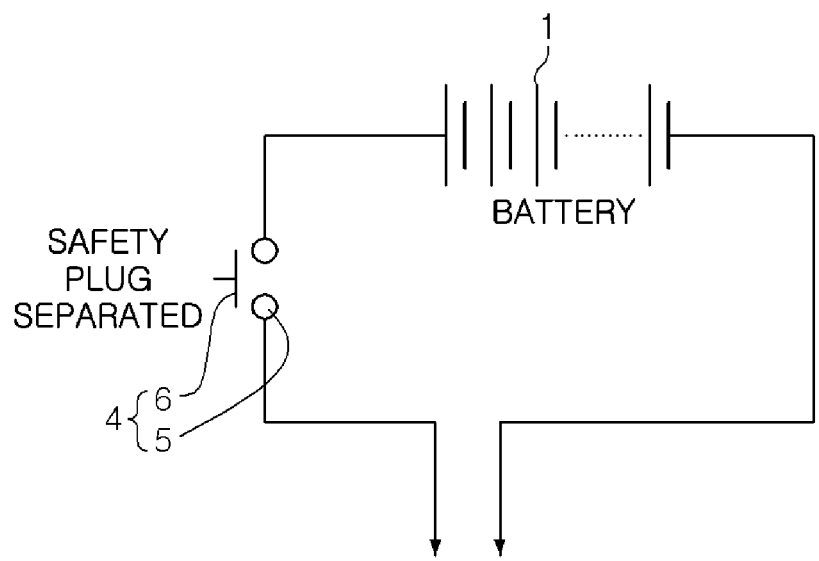
(B)

HIGH VOLTAGE SAFETY DEVICE FOR HIGH VOLTAGE BATTERY

CROSS-REFERENCE TO RELATED APPLICATIONS

The present application claims priority to Korean Patent Application Number 10-2009-0116632 filed Nov. 30, 2009, the entire contents of which application is incorporated herein by this reference.

BACKGROUND OF THE INVENTION

1. Field of the Invention

The present invention relates to a safety device for a high voltage battery.

2. Description of Related Art

In general, hybrid systems are necessarily equipped with an HEV high voltage battery to achieve high power efficiency.

However, a human body may be seriously hurt by the DC voltage of 100V ~300V of the HEV high voltage battery while electric components may be damaged in a mis-operation.

Accordingly, the HEV high voltage battery mounted in vehicle is equipped with various interlock type safety devices preventing the high voltage portion from being exposed and strengthening safety.

However, although the interlock type safety devices strengthens safety for the high voltage portion by preventing separation from the high voltage cover, it is inconvenient to maintain or separate the safety cover and the cost is necessarily increased, because the structure is complicated by the interlock.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a high voltage cover safety device that makes it to easily maintain or separate a safety cover and reduce the cost, by preventing unintended separation of the high voltage cover, without using interlock to strengthen safety for a high voltage portion of an HEV high voltage battery of 100V to 300V DC voltage.

An aspect of the present invention provides a high voltage safety device for a high voltage battery, which includes a switch terminal forming a switch of an electric circuit for a high voltage portion and protruding to be fitted in a position hole of a high voltage cover, and a plug forming the electric circuit by connecting the switch when being fitted on the switch terminal and having a size occupying a portion of the high voltage cover.

The switch terminal protrudes from the high voltage cover when being fitted in a position hole of the high voltage cover.

The plug has a handle operated by a hand and a switch connection terminal protruding from the handle to connect the electric circuit with the high voltage portion when being fitted in the switch terminal.

The handle has a size covering the position hole of the high voltage cover.

According to the present invention, it is possible to prevent unintended separation of a high voltage cover without having to use a relatively expensive interlocking device, such that it is possible to easily maintain or separate a safety cover when maintenance or removal are needed. Further, it is possible to arouse customer's interest and ensure reliability for consumers.

The present invention has the above and other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIGS. 3A and 3B are views showing connection/disconnection between an electric circuit and the high voltage safety device according to the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Figure 1:
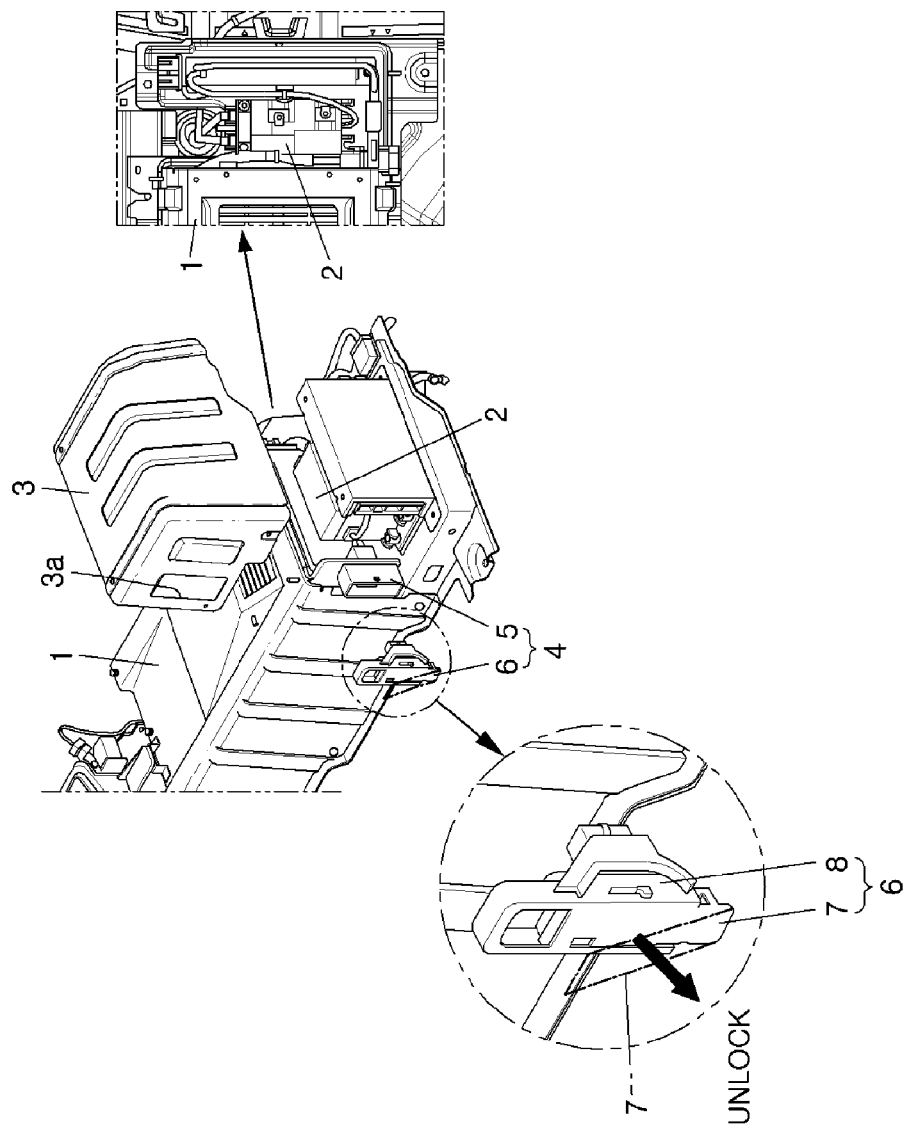
FIG. 1 is a view showing the configuration of an HEV high voltage battery equipped with a high voltage cover safety device according to an embodiment of the present invention.

FIG. 1 is a view showing the configuration of a high voltage battery equipped with an HEV high voltage safety device according to an embodiment of the present invention. The HEV high voltage battery 1 includes a high voltage cover 3 and a safety device 4. The high voltage cover 3 covers a high voltage portion 2 disposed at a side of the HEV high voltage battery. The safety device 4 functions to prevent the high voltage cover 3 from being separated in an unintended way.

In this embodiment, the safety device 4 comprises a switch terminal 5 and a plug 6. The switch terminal 5 forms an electric circuit together with the high voltage portion 2. The plug 6 restrains the high voltage cover 3 so as not to be separated while connecting the electric circuit of the switch terminal 5 in an assembly.

The switch terminal 5 is disposed at a side of the high voltage portion 2 in a protruding connector and restricts movement of the high voltage cover 3 by being fitted in a position hole 3a of the high voltage cover 3.

The plug 6 comprises a handle 7 and a switch connection terminal 8. The handle 7 is operated by a hand and has a size that can cover the portion around the position hole 3a of the high voltage cover 3. The switch connection terminal 8 protrudes from the handle 7 to connect the electric circuit with the high voltage portion 2 when being fitted in the switch terminal 5.

Figure 2:
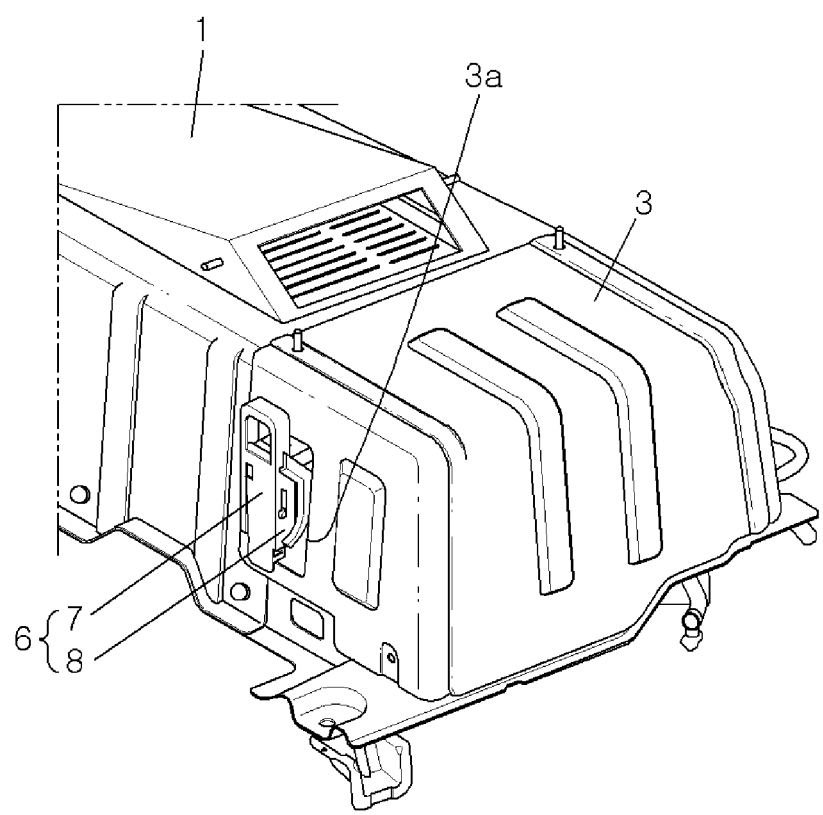
FIG. 2 is a view of the high voltage battery of FIG. 1 in assembled state.

FIG. 2 shows an assembled HEV high voltage battery 1. As shown in the FIG. 2, the high voltage portion 2 is covered with the high voltage cover 3 by fitting in the position hole 3a the switch terminal 5 protruding from high voltage portion 2, and the plug 6 is fitted on the switch terminal 5.

After the assemblage, the plug 6 covers the switch terminal 5 protruding from the position hole 3a of the high voltage cover 3 and the handle 7 of the plug 6 covers the portion around the position hole 3a of the high voltage cover 3, thereby increasing visibility.

FIG. 3A shows the electric circuit of the high voltage portion 2 in a connected state.

The electric circuit connection is simply implemented by inserting the switch connection terminal 8 protruding from the handle 7 into the switch terminal 5, when the plug 6 is fitted on the switch terminal 5.

When the plug 6 of the safety device 4 is fitted on the switch terminal 5 at a side of the high voltage portion 2, the switch connection terminal 8 forms an electric circuit for the high voltage portion 2 by the switch connection and the handle 7 restrains the high voltage cover 3 in a larger shape than the position hole 3a of the high voltage cover 3.

In this state, when it needs to separate the high voltage cover 3 without separating the plug 6, the high voltage cover 3 cannot be unintendedly separated since the handle 7 restricts movement of the high voltage cover 3.

FIG. 3B shows the electric circuit of the high voltage portion 2 in a disconnected state.

Disconnecting the electric circuit, as described above, cuts switch connection of the switch connection terminal 8 such that an electric circuit for the high voltage portion 2 is not formed, by holding the handle 7 and pulling the switch connection terminal 8 from the switch terminal 5.

After the plug 6 is pulled, the high voltage cover 3 is not restrained by the plug 6, such that the high voltage cover 3 can be separated, as shown in FIG. 1.

That is, when the plug 6 is pulled out of the switch terminal 5 and then the high voltage cover 3 is separated from a side of the switch terminal 5, the high voltage portion 2 with the electric circuit cut can be opened, such that it is possible to work while ensuring sufficient safety against high voltage.

As described above, in this embodiment, it is possible to prevent unintended separation of the high voltage cover 3, using the plug 6, without using a relatively expensive interlock device, and to work after disconnecting the electric circuit for the high voltage portion 2 when separating the high voltage cover; thereby ensuring safety for the high voltage portion.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A high voltage safety device for a high voltage battery, comprising:
    a switch terminal forming a switch of an electric circuit for a high voltage portion and protruding to be fitted in a position hole of a high voltage cover; and
    a plug forming the electric circuit by connecting the switch when being fitted on the switch terminal and having a size occupying a portion of the high voltage cover, the plug including a handle that restricts movement of the high voltage cover, wherein the handle protrudes from the position hole in the cover and abuts a side surface of the high voltage cover, wherein the high voltage cover is prevented from being separated from the high voltage device via the plug being inserted into the switch terminal.

2. The high voltage safety device for a high voltage battery as defined in claim 1, wherein the switch terminal protrudes from the high voltage cover when being fitted in the position hole of the high voltage cover.

3. The high voltage safety device for a high voltage battery as defined in claim 1, wherein the plug has a handle operated by a hand and a switch connection terminal protruding from the handle to connect the electric circuit with the high voltage portion when being fitted in the switch terminal.

4. The high voltage safety device for a high voltage battery as defined in claim 3, wherein the handle has a size covering the position hole of the high voltage cover.

\* \* \* \* \*